United States Patent [19]

Machi et al.

[11] 4,283,442
[45] Aug. 11, 1981

[54] METHOD OF PRODUCING A DIMENSIONALLY STABLE BATTERY SEPARATOR

[75] Inventors: Sueo Machi, Takasaki; Isao Ishigaki, Maebashi; Takanobu Sugo, Gunma; Kazuo Murata; Shiro Tanso, both of Takatsuki; Keizi Senoo, Takasaki, all of Japan

[73] Assignees: Japan Atomic Energy Research Institute, Tokyo; Yuasa Battery Co. Ltd., Osaka, both of Japan

[21] Appl. No.: 118,103

[22] Filed: Feb. 4, 1980

[30] Foreign Application Priority Data

Feb. 5, 1979 [JP] Japan ................................. 54/11985

[51] Int. Cl.³ .............................................. B05D 3/06
[52] U.S. Cl. ................................ 427/171; 204/159.14; 204/159.15; 204/159.2; 427/44; 427/54.1; 427/115; 427/126.1; 429/249

[58] Field of Search ................. 427/35, 440, 54.1, 36, 427/115; 204/159.14, 159.15, 159.2; 429/129, 249, 250

[56] References Cited

U.S. PATENT DOCUMENTS

| 3,088,791 | 5/1963 | Cline et al. ............................. 427/44 |
| 3,262,808 | 7/1966 | Crooks et al. ......................... 427/171 |
| 3,322,661 | 5/1967 | Yoshikawa et al. ............. 204/159.17 |
| 3,427,206 | 2/1969 | Scardaville et al. .................... 427/44 |
| 3,892,594 | 7/1975 | Charlesby et al. ...................... 427/36 |
| 3,955,015 | 5/1976 | Mostev et al. ....................... 427/54.1 |
| 4,031,162 | 6/1977 | Brax et al. ............................. 427/171 |
| 4,143,218 | 3/1979 | Adams et al. ......................... 427/171 |

Primary Examiner—John H. Newsome
Attorney, Agent, or Firm—Browdy and Neimark

[57] ABSTRACT

A method of producing a dimensionally stable battery separator characterized by grafting acrylic acid and/or methacrylic acid onto a polyethylene film, treating the resulting membrane with an aqueous alkaline solution, and drying the treated membrane under application of tension.

3 Claims, No Drawings

METHOD OF PRODUCING A DIMENSIONALLY STABLE BATTERY SEPARATOR

This invention relates to a method of producing a battery separator, particularly a separator for a battery using an aqueous alkaline solution as an electrolyte. The method is characterized by grafting acrylic acid and/or methacrylic acid to a polyethylene film, treating the resulting membrane with an aqueous alkaline solution and drying the so treated membrane under application of tension. The membrane can be used as a dimensionally stable battery separator that undergoes only slight longitudinal and transversal expansion during swelling in the electrolyte.

Separators for use in alkaline storge cells, particularly zinc-silver oxide cells using silver oxide or peroxide as cathode and zinc or cadmium as anode are made of semipermeable membranes that suppress the migration of silver hydroxide ions from the cathode to anode; such semipermeable membranes include regenerated cellulose membrane, cross-linked polyvinyl alchohol membrane and polyethylene membrane which has a polymer of acrylic acid grafted thereon. These hydrophilic membranes swell in an alkaline electrolyte and serve as a battery separator that exhibits good ion conductivity and low electrical resistance. A membrane comprising a polyethylene film to which acrylic acid and/or methacrylic acid containing carboxylic group is grafted has sufficiently high alkali resistance and oxidation resistance to serve as a good battery separator.

That a membrane prepared from a polyethylene film to which acrylic acid has been grafted can be used as a separator for zinc-silver oxide cells is described in U.S. Pat. No. 3,427,206. The patent teaches the grafting of acrylic acid and other dissociative group containing monomers by what is called simultaneous irradiation wherein the base film of polyethylene is irradiated with gamma-rays from cobalt 60 as it is immersed in a monomer solution. This method however has the disadvantage of causing radiation-induced homopolymerization of the monomer of the monomeric solution and of the free monomer in the film under irradiation, and as a result, it is difficult for the method to produce a membrane of good quality having uniform distribution of the degree of graft and which exhibits minimum variation in thickness and electrical resistance.

When the membrane of graft copolymer prepared by the method described above is immersed in a 40% aqueous solution of caustic potash generaly used as electrolyte for zinc-silver oxide cells, it swells and expands unevenly due to the difference in the ratio of expansion between longitudinal and transversal directions. In addition, the greater ratio of expansion in whichever direction is as much as about 20%. What is more, uneven grafting of monomers to the base film causes wrinkles to be formed in the resulting membrane. In fact, a separator prepared by uneven graft copolymerization and which swells to great extent presents several problems when used in a zinc-silver oxide cell. For example, the installation of a separator in a button zinc-silver oxide cell involves stamping a disk of separator, fitting it between positive and negative plates, dripping on the separator an electrolyte to be absorbed by it. If the separator is made of a membrane of graft copolymer that swells and expands greatly and unevenly at that, it exceeds the cell container in size or deforms into an oval to cause the cell to shortcircuit or render the retainer to be insufficiently clamped, thereby promoting leakage of the electrolyte.

Installation of separator in a cylindrical or prismatic cell entails sandwiching a dry separator between positive and negative plates or enclosing the plates with such separator prior to filling of an electrolyte. The separator swells in the electrolyte and if it enlarges to exceed the plates in size, and excessive force is applied to the plates and container to form wrinkles in the separator between the plates. This causes the current density at each plate upon discharge to differ from place to place, inducing the positive or negative active material to come off the respective plate, which in turn causes deterioration of each plate and shortcircuiting of the cell.

It has recently been found that "pre-irradiation method" wherein a base film is first irradiated with ionizing radiation before it is immersed in a monomer solution for graft polymerization is more effective than "simultaneous irradiation" in providing a membrane of uniform graft copolymer. According to this method that immerses the irradiated film in the monomer solution, graft copolymerization occurs only at the sites activated by irradiation, and the result is that less homopolymer is formed within and outside the film to provide a membrane of highly uniform graft polymer. However, no matter how uniform the grafting that is achieved by "pre-irradiation", the resulting membrane when immersed in an alkaline electrolyte swells to expand by as much as 10 to 20% of the original size. Therefore, even the preirradiation method is not capable of providing a dimensionally stable membrane that is free from any of the undesired outcomes with respect to the cell performance.

The inventors of this invention measured the change in the dimensions of a membrane of graft polymer under various conditions and found that longitudinal expansion was predominant during grafting whereas transversal expansion was predominant in an alkaline electrolyte. This is because the polyethylene base film to which a monomer compound is being grafted has a tendency to expand in the longitudinal direction, and on the other hand, the resulting membrane of graft polymer expands transversally rather than longitudinally when the carboxyl groups are substituted by an alkali metal to render the membrane in the form of an alkali salt. The thinner the alkali solution and the higher the temperature of the solution, the faster the rate of swelling of the membrane and the greater the expansion it undergoes. In addition, immersion in a thin alkali solution provides a membrane having low electrical resistance. A membrane dried after being rendered in the form of an alkali salt by treatment with a dilute alkaline solution expanded in equal ratios in both longitudinal and transversal directions but the degree of expansion was not small enough not to affect the cell performance adversely. Therefore, the inventors of this invention made an attempt at treating a membrane of graft polymer with alkali to let it swell to the maximum extent and then drying it under application of tension to minimize its shrinkage, and in consequence, they found that the so dried membrane is dimensionally stable and can be used as a separator of good electrical characteristics that expands only a little extent when immersed in an alkaline electrolyte. A performance test on the membrane installed in a cell showed that unlike the conventional separator, the membrane did not cause a drop in cell performance. Accordingly, the inventors found that the technique of drying an alkali-treated membrane of graft polymer under application of tension is very simple and effective way of providing a dimensionally stable and highly performing battery separator.

Known methods of minimizing the expansion of membrane due to swelling include crosslinking with electron beam wherein the membrane is irradiated with an electron beam accelerator to give a dose of 30–50 Mrads, and providing the membrane with network structure by treating it with a crosslinking agent such as divinyl benzene. However, these methods are costly and require a complex reaction. What is more, a crosslinked membrane has high electrical resistance and this defect is not compensated for by the desired suppression of the membrane from expanding due to swelling. On the other hand, a separator prepared by drying an alkali-treated membrane of graft polymer under application of tension did not undergo a great dimensional change when it was installed in a cell, and therefore, the cell was entirely free from such troubles as shortcircuiting and electrolyte leakage.

According to the method of this invention, an alkali-treated membrane is dried preferably under application of a tension of from 2 to 80 kg/cm$^2$, more preferably from 5 to 30 kg/cm$^2$. The higher the degree of graft, namely, the greater the number of hydrophilic groups present in the membrane, the more the membrane expands due to swelling. Therefore, a suitable tension should be determined depending upon the desired degree of graft, the material of which the membrane is made, and the strength of the membrane.

An alkali-treated membrane can be dried under continuous application of tension by such simple and inexpensive means as hot press rolls, powder rolls, expander rolls, spiral rolls and rolls with chucks.

This invention has been described hereinabove in connection with a membrane prepared from a polyethylene base film to which acrylic acid and/or methacrylic acid is grafted using water as a solvent for monomer solution. This invention however is not limited to this embodiment alone and it is applicable to other membranes such as those composed of polypropylene and other polyolefin resins or fluorine-containing polyolefin resins such as tetrafluoroethylene-vinyl fluoride copolymer or ethylene-ethylene tetrafluoride copolymer, and to other solvents such as organics typified by xylene, carbon tetrachloride, benzene and toluene.

As described in the foregoing, this invention has a great industrial value in that it provides a battery separator assuring high cell performance. This invention is now described in greater detail by reference to the following examples which are given here for illustrative purposes only and are by no means intended to limit the scope of the invention.

EXAMPLE 1

A low-density polyethylene (product of Asahi-Dow Co., Ltd.) having a melt index 2.0 and a density 0.292 was formed by inflation into a film into a 25 microns thick. The film was put in a polyethylene bag which was purged with nitrogen. The film was then irradiated with an electron beam accelerator (2 MeV, 1 mA) for a total dose of 20 Mrads. The irradiated film was placed in a glass ampule which was evacuated to $10^{-4}$ mmHg. The glass ampule was filled with a monomeric solution consisting of 50% aqueous acrylic acid from which dissolved oxygen had been removed with nitrogen and 0.25% of Mohr'salt serving as a polymerization inhibitor. After a 5-hour grafting at 25° C., the resulting membrane of graft polymer was removed from the ampule and washed with hot water at 95° C. for one hour to be freed of excess acrylic acid and homopolymerized acrylic acid. The membrane was then freed of the iron content with 5% hydrochloric acid at 95° C., and dried to provide a membrane having a degree of graft of 85%. The membrane was treated with 5% aqueous caustic potash at 95° C. for 30 minutes to render it in the form of a potassium salt, and then it was freed of excess alkali by washing with hot water. A battery separator was prepared from the wet membrane by drying it with air under application of a tension of 10 kg/cm$^2$ in both longitudinal and transversal directions. The separator was immersed in 40% aqueous caustic potash and it swelled to expand by 2% longitudinally and 1% transversally.

A control seprarator which was prepared by air-drying a membrane of the same composition as above without application of tension expanded in size by 18% longitudinally and 16% transversally.

EXAMPLE 2

A high-density polyethylene (product of Asahi Chemical Industry Co., Ltd.) having a melt index 2.2 and a density 0.955 was dormed by inflation into a film 30 microns thick. A membrane having a degree of graft of 120% was prepared from the film by repeating the procedure of Example 1. A battery separator was prepared from the membrane by drying it with hot air (60° C.) that was blown on the membrane for 30 minutes under application of a longitudinal tension of 15.0 kg/cm$^2$ and a transversal tension of 7.5 kg/cm$^2$. The separator was immersed in 40% aqueous caustic potash and it swelled to expand by 1% longitudinally and 2% transversally. A control separator prepared by drying without application of tension expanded in size 21% longitudinally and 19% transversally.

What is claimed is:

1. A method of producing a dimensionally stable battery separator characterized by grafting acrylic acid and/or methacrylic acid onto a polyethylene film, treating the resulting membrane with an aqueous alkaline solution, and drying the treated membrane under application of tension.

2. A method of claim 1 wherein the tension applied to the membrane is from 2 to 80 kg/cm$^2$.

3. A method of claim 1 wherein the tension applied to the membrane is from 5 to 30 kg/cm$^2$.

* * * * *